United States Patent [19]
Matthews, III

[11] Patent Number: 6,005,602
[45] Date of Patent: *Dec. 21, 1999

[54] MESSAGE DELIVERY METHOD FOR INTERACTIVE TELEVIDEO SYSTEM

[75] Inventor: Joseph H. Matthews, III, Redmond, Wash.

[73] Assignee: Microsoft Corporation, Redmond, Wash.

[*] Notice: This patent is subject to a terminal disclaimer.

[21] Appl. No.: 09/241,827

[22] Filed: Feb. 1, 1999

Related U.S. Application Data

[63] Continuation of application No. 08/968,386, Nov. 12, 1997, Pat. No. 5,874,985, which is a continuation of application No. 08/521,799, Aug. 31, 1995, abandoned.

[51] Int. Cl.⁶ ...................................................... H04N 7/14
[52] U.S. Cl. .................................... 348/7; 348/12; 348/13
[58] Field of Search ............................... 348/6, 7, 12, 13, 348/9, 10; 455/4.2, 4.1, 5.1, 6.1, 6.2; H04N 7/14, 7/10

[56] References Cited

U.S. PATENT DOCUMENTS

| | | |
|---|---|---|
| 3,891,792 | 6/1975 | Kimura . |
| 4,890,320 | 12/1989 | Monslow ..................................... 348/7 |
| 5,260,778 | 11/1993 | Kauffman . |
| 5,512,934 | 4/1996 | Kochanski ................................... 348/7 |
| 5,585,838 | 12/1996 | Lawler ...................................... 348/13 |

FOREIGN PATENT DOCUMENTS

| | | |
|---|---|---|
| 2232031 | 11/1990 | United Kingdom . |
| 89/10664 | 11/1989 | WIPO . |

*Primary Examiner*—Sherrie Hsia
*Attorney, Agent, or Firm*—Klarquist Sparkman Campbell Leigh & Whinston, LLP

[57] ABSTRACT

The present invention includes a method of selectively delivering programming to a viewer station (e.g., a home) on an interactive television or televideo (IT) system. The method includes delivering a message to a selected viewer station having a selected video display set. The message may be delivered while the selected viewer station receives virtually any programming over the interactive televideo system, including selected programming that is chosen by a viewer at the selected viewer station and is carried on a selected programming channel. With reference to a preferred embodiment, the IT system transmits a message signal to the selected viewer station on a communication channel different from the channels carrying the programming, including the selected programming channel. The interactive station controller receives the message signal and generates from it a viewer message.

10 Claims, 4 Drawing Sheets

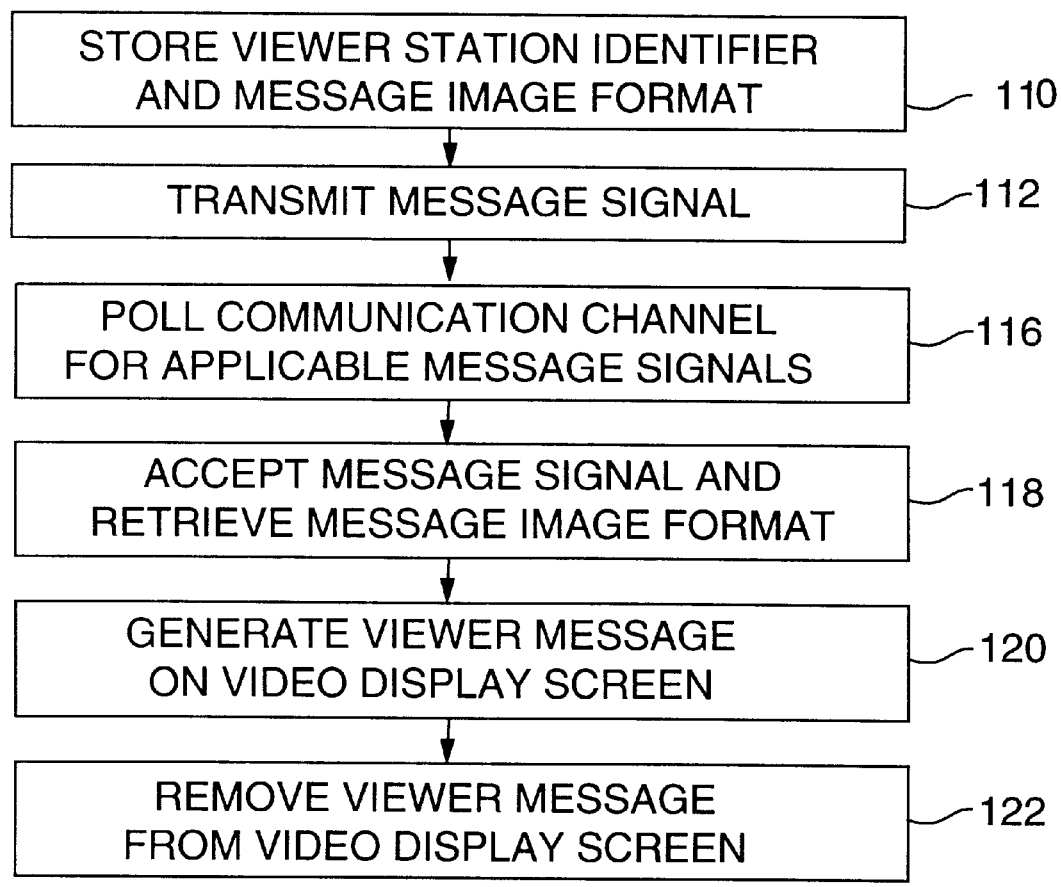

MESSAGE DELIVERY METHOD FOR INTERACTIVE TELEVIDEO SYSTEM

CROSS REFERENCE TO RELATED APPLICATION

This application is continuation of application Ser No. 08/968,386, filed Nov. 12, 1997, U.S. Pat. No. 5,874,985, which was a continuation of application Ser. No. 08/521,799, filed Aug. 31, 1995, now abandoned.

FIELD OF THE INVENTION

The present invention relates to interactive television or televideo systems and, in particular, to a method of delivering messages to viewer stations associated with such systems.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, IT systems under development could include the equivalent of 500 channels of video broadcasting and unlimited numbers of interactive applications.

Conventional broadcast television networks primarily transmit scheduled video programming that emphasizes entertainment, education, or commercial advertising. The conventional scheduled programming is sometimes interrupted for unscheduled public announcements relating to, for example, broadcast system technical difficulties, critical events, or weather or disaster alerts.

Public announcements in conventional broadcast television systems are broadcast on the channels carrying the scheduled programming. Critical public announcements typically are broadcast as substitutes for the scheduled programming. The broadcasting of the scheduled programming is stopped and in its place the public announcement is broadcast. These substitution-type public announcements commonly are voiced or spoken and include a video segment or a still-image graphic display. This type of public announcement is typically used to announce broadcast system technical difficulties and weather or disaster alerts.

Non-critical public announcements may be generated as text that is added to a video broadcast signal (e.g., along a bottom display screen margin). The broadcasting of the scheduled programming continues uninterrupted, but the broadcast signal carrying the scheduled programming is modified to include the public announcement text. These modification-type public announcements seldom include voice or spoken components and are commonly used to announce non-critical programming delays or news (e.g., sports results).

Typically, public announcements are made by the broadcasters that provide or generate the programming carried on a particular channel. Conventional cable television (CATV) network operators seldom generate such announcements. Conventional CATV network operators are substantially passive rebroadcasters of programming provided or generated by others. As a consequence, viewers of a conventional CATV network typically can receive public announcements only if the viewers are tuned to programming provided by a broadcaster that makes public announcements (e.g., conventional local television stations or national television networks).

With the relatively large amounts of programming planned for IT systems, it is expected that the proportion of viewers tuned to such conventional broadcasters will decline. Much of the alternative programming is likely to be generated by providers who are remote from the viewer or have no public announcement capabilities. With conventional channel-based broadcasting of public announcements, viewers tuned to such programming could be denied the benefit of receiving public announcements. For critical events and local weather or disaster alerts, the absence of public announcement services can pose a grave risk to viewers.

In addition to the difficulty of delivering public announcements to the program or channel a viewer is actually watching, another disadvantage is that public announcements on conventional television are delivered to all viewers tuned to a particular channel. As a consequence, conventional television is incapable of providing a public announcement only to specific viewers for which the announcement is applicable or appropriate.

With particular reference to IT systems, conventional substitutions or modifications of video signals for public announcements is incompatible with programming in the form of computer-executed applications. Many such applications would not include a video broadcast that could be modified with a public announcement. Moreover, public announcements could unpredictably disrupt the operation of such applications.

SUMMARY OF THE INVENTION

The present invention includes a method of selectively delivering programming to a viewer station (e.g., a home) on an interactive television or televideo (IT) system. The IT system includes a central control node that delivers programming to multiple viewer stations. Each viewer station has a video display set (e.g., a television receiver) and an associated interactive station controller that is responsive to input from the viewer for controlling programming on the video display set.

The method of this invention includes delivering a message to a selected viewer station. The message preferably is formed at the central control node and directed to the selected viewer station in accordance with computer-executed software of this invention. Similarly, the selected viewer station receives and responds to the message in accordance with the software.

The message may be delivered while the selected viewer station receives any programming over the interactive televideo system, including selected programming that is chosen by a viewer at the selected viewer station and is carried on a selected programming channel. The selected programming may be conventional video programming or a computer-executed application.

With reference to a preferred embodiment, the IT system transmits a message signal to the selected viewer station on a communication channel different from the channels carrying the programming, including the selected programming channel. The interactive station controller receives the message signal and generates from it a viewer message.

The interactive station controller renders the viewer message on the video display set over the selected programming. The viewer message selectively includes a viewer acknowledgement block requiring the viewer to acknowledge the viewer message to have it removed from the video display set. Alternatively, the viewer message remains for a preselected duration and then is removed automatically.

This invention allows an IT system operator to provide public announcements to any or all subscribers regardless of the programming they are receiving. The public announcement can provide information to viewers receiving programming generated by any source, including computer-executed applications operated by the IT system. The IT system operator can provide such announcements without having to modify each of up to about 500 channels of programming.

The foregoing and other features and advantages of preferred embodiments of the present invention will be more readily apparent from the following detailed description, which proceeds with reference to the accompanying drawings.

BRIEF DESCRIPTION OF THE DRAWINGS

FIG. 5 is a flow diagram of a method of delivering a message to a selected viewer station according to the present invention.

DETAILED DESCRIPTION OF PREFERRED EMBODIMENTS

Figure 1:
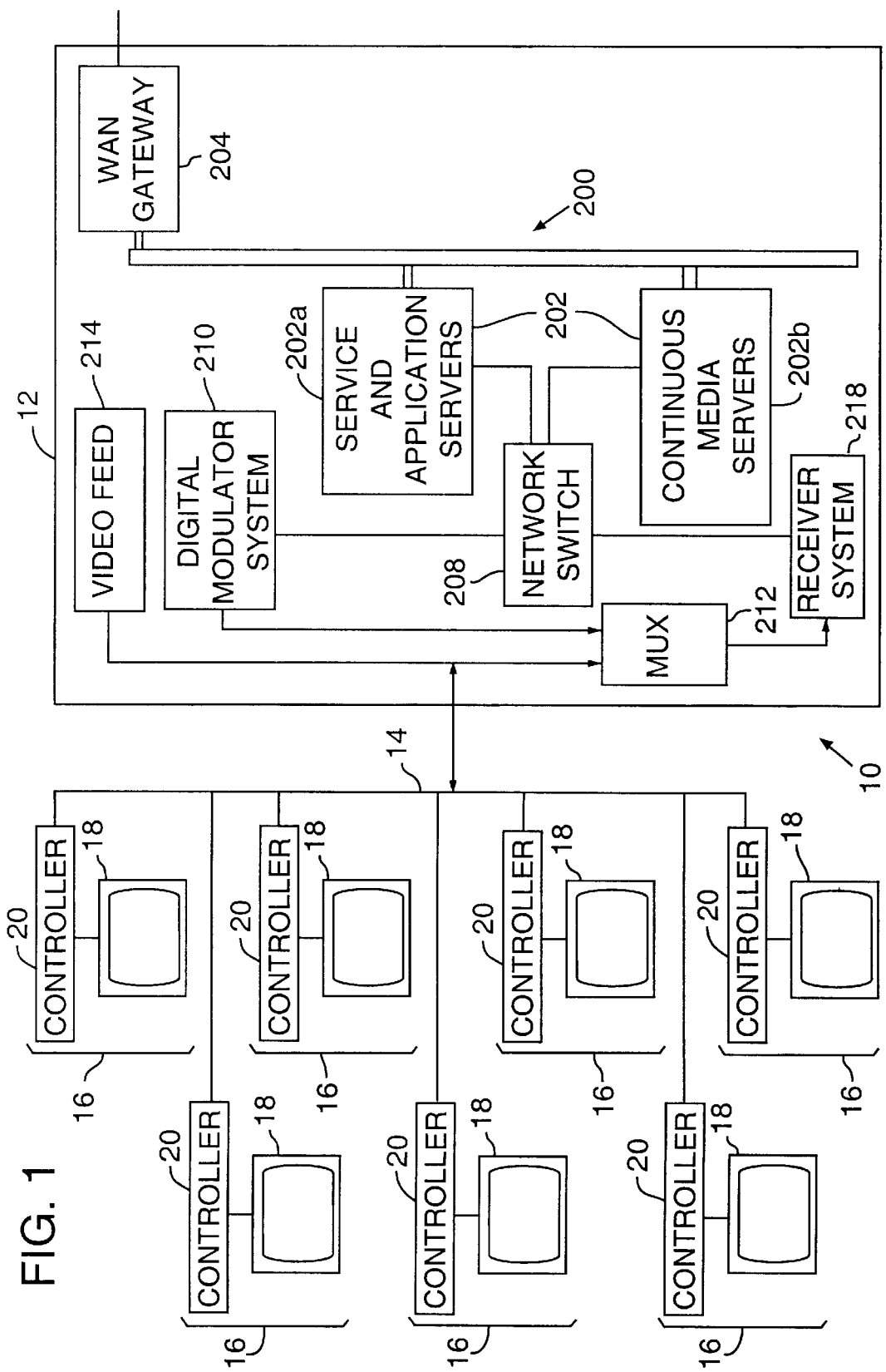
FIG. 1 is a block diagram of an interactive television system used for the preferred embodiment of this invention.
Figure 2:
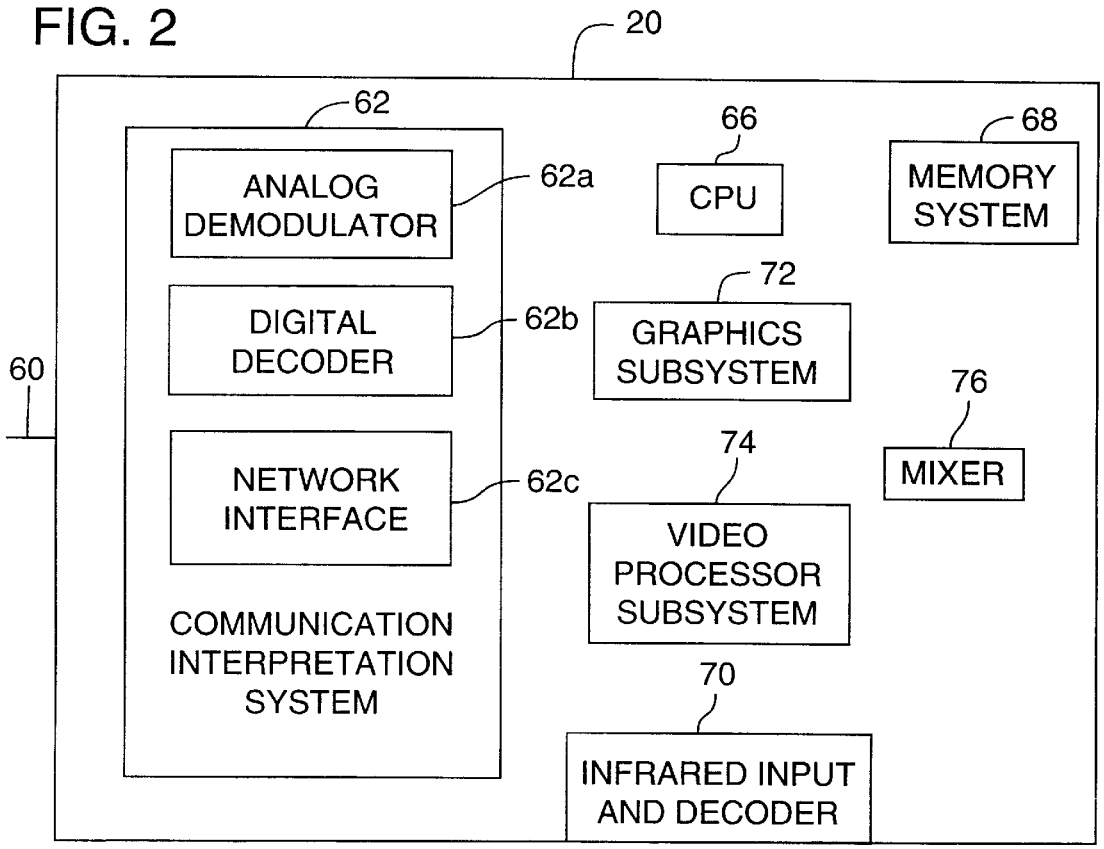
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20, as described below in greater detail.

Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control node 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes an input 60 that delivers communication or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control node 12 at input 60. Video decoder 62b functions as a digital equivalent of demodulator 62a for selecting one of multiple digital video signals received at input 60 from central control node 12. Network communication interface 62c communicates with central control node 12 with digital information carried over baseband frequencies. The baseband frequencies may be below the conventional analog video signal frequencies, above the digital video signal frequencies, or between the frequencies of analog or digital signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 3) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, including interactive system user interface images, on video display set 18. A video processor subsystem 74, also controlled by CPU 66, provides control in the rendering of video imagery, including decompressing digital video signals and sizing and positioning a video display window.

A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3:
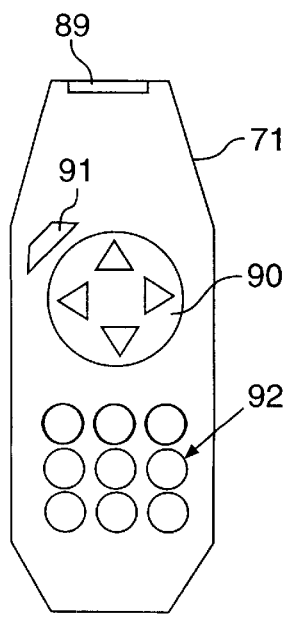
FIG. 3 is a plan diagram of a viewer control unit for providing viewer input to the interactive station controller of FIG. 2.

Referring to FIG. 3, viewer control unit 71 includes an infrared transmitter window 89 through which control unit 71 emits infrared signals to infrared input 70 of station controller 20. A directional control keypad 90 allows a viewer to transmit signals to station controller 20 according to displays it renders on the video display set 18. The viewer may initiate or activate selections by depressing an action key 91 and may enter numeric values with numeric key pad 92.

Figure 4A:
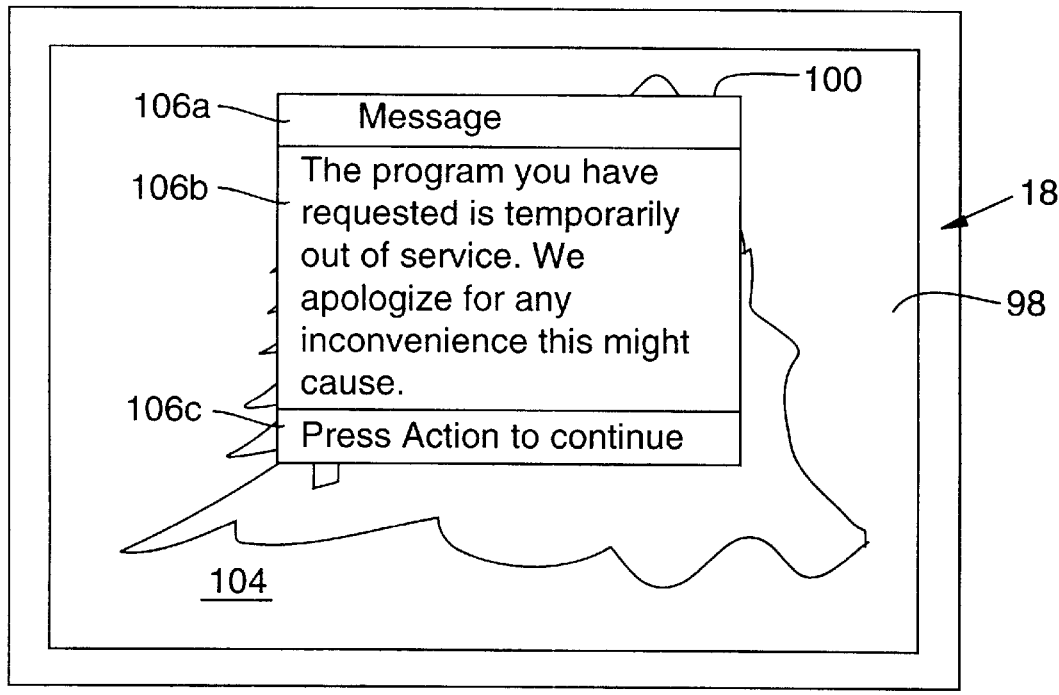
FIGS. 4A and 4B are diagrams of a video display screen with respective first and viewer message blocks of the present invention.
Figure 4B:
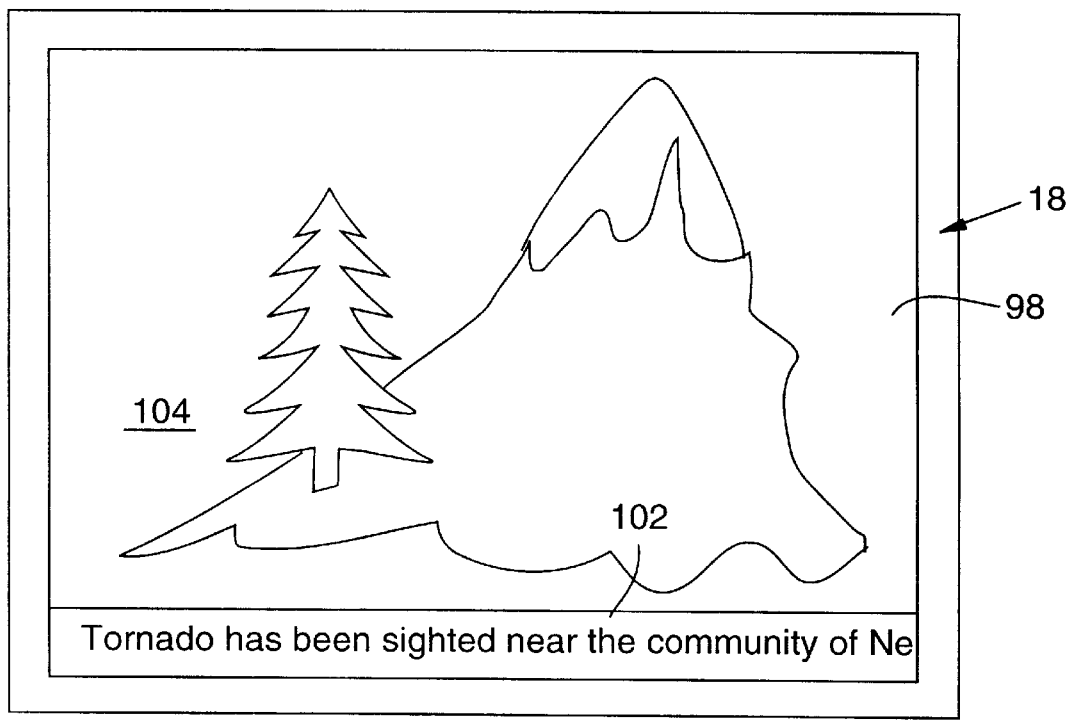

FIGS. 4A and 4B show a display screen 98 of one of video display sets 18 with, respectively, a message dialog block 100 and a flash message block 102 of the present invention rendered thereon. Message blocks 100 and 102 are formed in response to message signals received by the associated interactive station controller 20 from central control node 12. Message blocks 100 and 102 preferably are displayed over selected programming currently rendered on display screen 98. For purposes of illustration, FIGS. 4A and 4B each show a simplified graphic 104 representing selected programming over which message blocks 100 and 102 are rendered. The selected programming may include broadcast video material or computer-executed applications.

Dialog message block 100 includes a title segment 106a, a text body segment 106b, and a close prompt segment 106c. As suggested by the close prompt segment 106c, dialog message block 102 remains on display screen 98 and over the selected programming until a viewer acknowledges the message by pressing action key 91 on viewer control unit 71, or the expiration of a default message period.

Flash message block 102 preferably is configured as a horizontal band that extends across display screen 98 at a selectable vertical position. A single line of text extends across and typically scrolls horizontally through flash message block 102. Flash message block 102 remains on display screen for a duration determined at central control node 12.

As described below in greater detail, viewer messages can be delivered to selected viewer stations 16 and can be rendered over virtually any IT system programming. Selective delivery of viewer messages provides the capability to transmit universal messages to all viewer stations 16, as well as individualized messages to different viewer stations 16. Individualized messages can relate, for example, to IT system accounting matters or replies to service inquiries.

FIG. 5 is a flow diagram showing a method of delivering a message to a selected viewer station 16 of IT system 10. The message is formed at central control node 12 and directed to selected viewer station 16 by this method in accordance with computer-executed software. Similarly, selected viewer station 16 receives and responds to the message in accordance with the software. The method of FIG. 5 is described with reference to delivering a message to a single viewer station 16. It will be appreciated that the method is similarly applicable to delivering a message to any group of viewer stations 16, including all viewer stations 16 of IT system 10.

Process block 110 indicates that a viewer station identifier corresponding to the selected viewer station 16 and a message image format representing at least one of dialog message block 100 and flash message block 102 are stored in IT system 10. Preferably, the viewer station identifier is stored within memory 68 of interactive station controller 20 and at central control node 12, and the message image formats representing both message blocks 100 and 102 are stored in memory 68. The message image formats stored within memory 68 of interactive station controller 20 allow messages to be transmitted to the selected viewer stations 16 with minimal message image format information.

The message image formats include graphic parameters by which graphic subsystem 72 of controller 20 can generate: message blocks 100 and 102, the text rendered within message blocks 100 and 102, and transitional graphic effects for indicating the opening and closing of a viewer message. For example, visual transitional effects could include shifting a message block 100 or 102 into place or constructing it from a dithered pixel pattern over a brief period. The message image formats can also include audio transitional effects, such as brief message opening and closing chimes or tones.

Process block 112 indicates that central control node 12 transmits a message signal over IT system 10 to the selected viewer station 16. The message signal includes a message, a station identifier corresponding to the selected viewer station 16, and a message image format indicator representing a dialog message block 100 or a flash message block 102. The message image format indicator includes specific message block information such as size for a dialog message block 100 and vertical screen position and duration for a flash message block 102. The message preferably is a text or written format and additional or alternatively includes an audio component (e.g., voice announcement). Moreover, a dialog message block 100 can additionally or alternatively include a video component. For messages directed to multiple selected viewer stations 16, the station identifier in the message signal would include a component common to all the multiple stations 16.

The message signal preferably is transmitted to the selected viewer station 16 on a channel different from the channels carrying programming. For example, the message signal may be transmitted on a dedicated IT system communication channel. The benefit of such a communication channel is that the interactive station controller 20 can receive the message signal regardless of the programming received by viewers at selected viewer station 16.

Process block 116 indicates that interactive station controller 20 of selected viewer station 16 polls the communication channel periodically for applicable message signals. Applicable message signals are directed to the selected viewer station 16 and include a station identifier corresponding to the one stored in station controller 20.

Process block 118 indicates that interactive station controller 20 of selected viewer station 16 identifies an applicable message signal, accepts it, and in response to it retrieves the corresponding message image format.

Process block 120 indicates that interactive station controller 20 generates a viewer message on the associated video display screen 78 in accordance with the message signal and the message image format. For example, the appropriate viewer message block is generated by the graphics subsystem 72.

Process block 122 indicates that the viewer message is removed from the video display screen 78. Whenever the viewer message is rendered as a dialog message block 100, the viewer message remains on display screen 98 until a viewer acknowledges the message according to the instructions in the close prompt segment 106c (e.g., press action key 91) or the expiration of a message default period (e.g., 5 minutes). Whenever the viewer message is rendered as a flash message block 102, the message is rendered on display screen 98 for the duration indicated in the message signal, which duration may be based upon an integer number of repetitions of the message text.

The method of this invention can provide messages over any programming carried on IT system 10, including conventional video programming and computer-executed applications. With regard to video programming, a message is rendered over the programming as it continues to be broadcast.

With regard to application programming, interactive station controller 20 interrupts or suspends execution of the programming in response to the message signal. Interruption or suspension of application execution is analogous to that characteristic of single-threaded multitasking operating systems such as Windows v.3.x from Microsoft Corporation. It will be appreciated that for some IT system services, such as video-on-demand, transmission of a video program could be suspended in the same manner as is application programming.

Referring to FIG. 1 central control node 12 includes a digital local area network (LAN) 200 with multiple computer servers 202 for performing various interactive system applications or functions referred to above. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information.

Servers 202 may include, for example, service and application servers 202a and continuous media servers 202b. Service and application servers 202a process interactive service requests from subscribers and provide services and applications associated with operation of IT system 10. Service and application servers 202a may be dedicated to particular applications such as message transmission, an electronic programming guide for viewers, network security, monitoring, object storage, financial transactions, data access, and other administration functions. An operator at central control node 12 can control message content and recipients through a terminal or console associated with the applicable server 202a, including selectively accessing audio or video components (e.g., from a server 202b).

Continuous media servers 202b provide storage and on-demand or near on-demand delivery of digitized video information. The digitized video information can include video programming of substantially any duration ranging from individual image frames and brief video clips to full-length motion pictures.

Servers 202 communicate with station controllers 12 via a network communication switch 208, such as an asynchronous transfer mode (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range, greater than the standard analog television frequency range, or between television signal frequencies.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents thereto.

What is claimed is:

1. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a selected viewer station receiving selected programming on a selected programming channel and rendering the selected programming on a selected video display set, a method of delivering a message to the selected viewer station, comprising:

transmitting a message signal over the interactive televideo system to the selected viewer station; and generating a viewer message from the message signal on the selected video display set, the viewer message being generated over the selected programming.

2. The method of claim 1 further comprising delivering the message signal to the selected interactive station controller, decoding the message signal within the selected interactive station controller, and generating the viewer message as a viewer message graphic image.

3. The method of claim 2 in which generating the viewer message graphic image includes a graphic block within which the viewer message is rendered.

4. The method of claim 2 further comprising storing a message image format within the selected interactive station controller and retrieving the message image format in response to the message signal to generate the viewer message in accordance with the viewer message graphic image.

5. The method of claim 1 in which the viewer message is generated over the selected programming until a viewer at the selected viewer station acknowledges the viewer message.

6. The method of claim 1 in which the message signal includes a message duration indicator and the viewer message is generated over the selected programming for a preselected duration corresponding to the message duration indicator.

7. The method of claim 1 in which a selected identifier is associated with the selected viewer station and the viewer message is generated at the selected viewer station only if the message signal includes the selected identifier.

8. The method of claim 7 in which the selected identifier includes an identifier component unique to the selected viewer station relative to other viewer stations of the interactive televideo system.

9. The method of claim 1 further comprising:
transmitting the message signal over the interactive televideo system to plural viewer stations that have associated video display sets and receive programming over multiple channels; and generating the viewer message from the message signal on the associated video display sets over the programming received over multiple channels.

10. The method of claim 1 in which the selected programming includes a computer-executed application and generating the viewer message includes suspending execution of the application.

* * * * *

UNITED STATES PATENT AND TRADEMARK OFFICE
CERTIFICATE OF CORRECTION

PATENT NO. : 6,005,602
DATED : December 21, 1999
INVENTOR(S) : Matthews

Page 1 of 1

It is certified that error appears in the above-identified patent and that said Letters Patent is hereby corrected as shown below:

<u>Column 3,</u>
Line 26, change first and viewer to first and second viewer

Signed and Sealed this

Fourth Day of September, 2001

Attest:

*Attesting Officer*

NICHOLAS P. GODICI
*Acting Director of the United States Patent and Trademark Office*